R. HUFF.
FOOT REST FOR MOTOR VEHICLES.
APPLICATION FILED APR. 16, 1906.

961,860.

Patented June 21, 1910.

Witnesses
J. G. Hinkel
B. C. Rust

Inventor
Russell Huff
by Foster Freeman Watson
Attorneys

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

FOOT-REST FOR MOTOR-VEHICLES.

961,860. Specification of Letters Patent. Patented June 21, 1910.

Application filed April 16, 1906. Serial No. 312,028.

*To all whom it may concern:*

Be it known that I, RUSSELL HUFF, a citizen of the United States, and resident of Detroit, Wayne county, State of Michigan, have invented certain new and useful Improvements in Foot-Rests for Motor-Vehicles, of which the following is a specification.

This invention relates to a foot rest for motor vehicles which is adjustable so that it may be put into operative position when needed and folded out of the way when not needed, although at all times securely connected to the vehicle so that it cannot be lost or mislaid.

Figure 1:
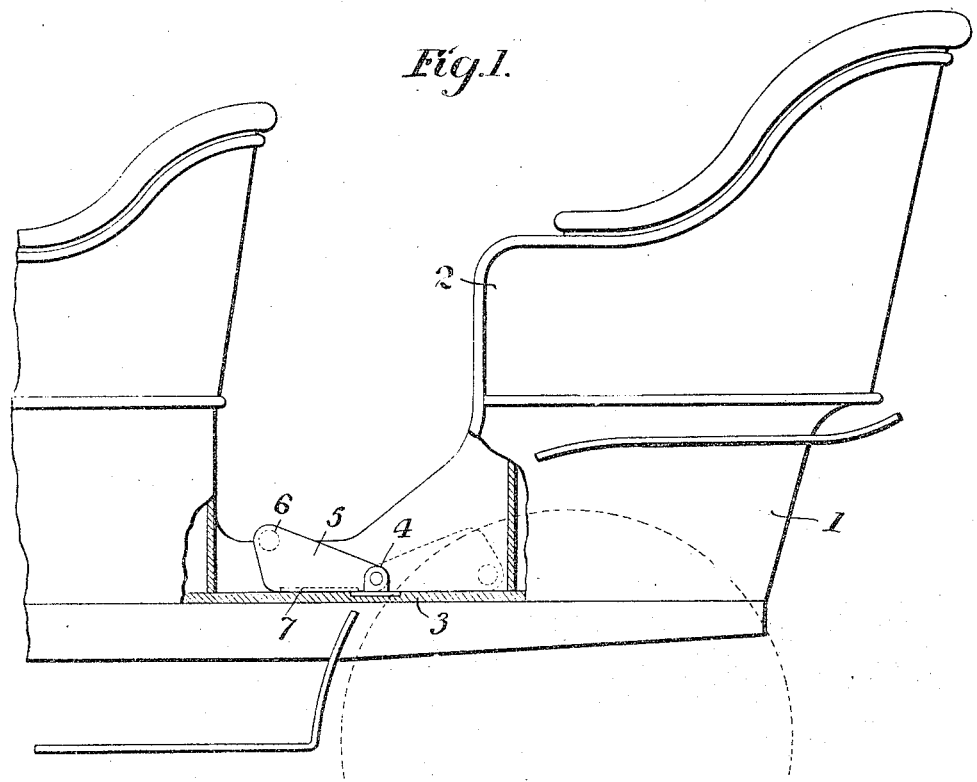
Figure 2:
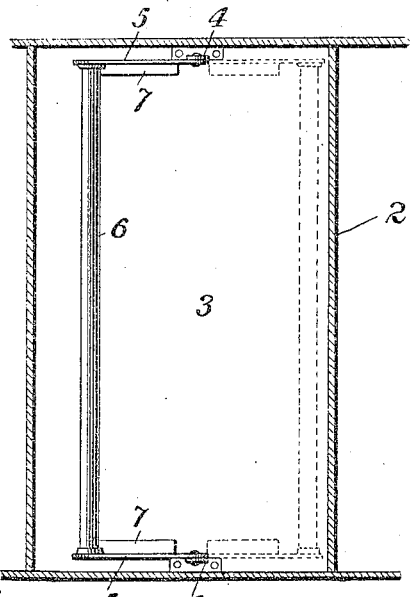

The invention is illustrated in the accompanying drawing, in which,

Figure 1 is a side view of a motor vehicle showing my improved foot rest in operative position in full lines and in its inoperative position in dotted lines; and Fig. 2 is a plan view of the foot rest.

It is found that the occupants of a motor vehicle do not need a foot rest, other than the floor of the vehicle, when the vehicle is running at an ordinary rate upon smooth roads. When running at a high speed or upon rough roads, however, it is very desirable to have a foot rest against which the feet can be firmly braced.

The present invention comprises a foot rest which is permanently connected with the vehicle and which can be moved from operative position into a position in which it does not interfere with the feet of the rider. The foot rest is pivotally connected with the car and adapted to be moved back close to the seat.

Referring to the drawing, 1 indicates the frame of the vehicle and 2 one of the seats. Upon the floor 3 at opposite sides of the vehicle are brackets 4 to which are pivotally connected a pair of arms 5. The outer or free ends of these arms are connected by a rod or bar 6 which forms the foot rest proper. Arms 5 are preferably triangular plates adapted when resting on the floor to hold the foot rest at some distance above the floor and they may be provided with flanges 7 which serve to stiffen them and also form "feet" upon which the arms rest. When the foot rest is in its operative position, as shown in full lines in Fig. 1, the bar 6 is supported at some distance above the floor of the vehicle. When the occupant of the vehicle desires to rest his feet upon the floor, which is the more comfortable position in ordinary smooth riding, the foot rest is folded back into the position shown in dotted lines in Fig. 1, in which the bar 6 is close to the floor and close to the front of the seat, being thus entirely out of the way of the person sitting on the seat. This is accomplished by making the arms substantially equal in length to the horizontal distance between the seat and the brackets, or in other words, locating the brackets at a distance from the seat substantially equal to the length of the arms.

Having described my invention what I claim and desire to secure by Letters Patent is, In a motor vehicle, the combination with the seat, of brackets connected with the frame of the vehicle forward of the seat, arms pivotally connected with the brackets, and a foot rest connected with and extending between the arms, said arms and foot rest being movable relatively to the seat into operative and inoperative position, the horizontal distance from the seat to the brackets being substantially equal to the length of the arms, whereby the rest may be brought close to the seat when in inoperative position, for the purpose set forth.

In testimony whereof I affix my signature in presence of two witnesses.

RUSSELL HUFF.

Witnesses:
MARK C. TAYLOR,
F. E. PAINE, Jr.